United States Patent
Guven et al.

(10) Patent No.: US 7,436,096 B2
(45) Date of Patent: Oct. 14, 2008

(54) ROTOR HAVING PERMANENT MAGNETS AND AXIALY-EXTENDING CHANNELS

(75) Inventors: Mustafa K. Guven, Dunlap, IL (US); Metin Aydin, Peoria, IL (US)

(73) Assignee: Caterpillar Inc., Peoria, IL (US)

( * ) Notice: Subject to any disclaimer, the term of this patent is extended or adjusted under 35 U.S.C. 154(b) by 133 days.

(21) Appl. No.: 11/261,629

(22) Filed: Oct. 31, 2005

(65) Prior Publication Data

US 2007/0096577 A1    May 3, 2007

(51) Int. Cl.
*H02K 1/27* (2006.01)
(52) U.S. Cl. .................................. 310/156.53
(58) Field of Classification Search .................
310/156.36–156.57, 58, 60 A, 61–63
See application file for complete search history.

(56) References Cited

U.S. PATENT DOCUMENTS

| | | | |
|---|---|---|---|
| 3,610,975 A * | 10/1971 | Onjanow | 310/57 |
| 3,696,260 A | 10/1972 | Lace | |
| 3,721,844 A | 3/1973 | Fong | |
| 3,979,821 A | 9/1976 | Noodleman | |
| 4,074,156 A * | 2/1978 | Widstrand et al. | 310/62 |
| 4,139,790 A | 2/1979 | Steen | |
| 4,308,479 A | 12/1981 | Richter | |
| 4,469,970 A | 9/1984 | Neumann | |
| 4,472,651 A | 9/1984 | Jones | |
| 4,506,181 A | 3/1985 | Jones et al. | |
| 4,510,680 A | 4/1985 | Miller et al. | |
| 4,525,925 A | 7/1985 | Jones | |
| 4,658,165 A | 4/1987 | Vanderschaeghe | |
| 4,692,646 A | 9/1987 | Gotou | |
| 4,916,346 A | 4/1990 | Kliman | |
| 4,918,831 A | 4/1990 | Kliman | |
| 4,924,130 A | 5/1990 | Fratta | |
| 5,053,657 A * | 10/1991 | Ikegami et al. | 310/63 |
| 5,091,668 A | 2/1992 | Cuenot et al. | |
| 5,097,166 A | 3/1992 | Mikulic | |
| 5,117,553 A | 6/1992 | Kliman | |
| 5,144,175 A * | 9/1992 | Craggs | 310/63 |

(Continued)

FOREIGN PATENT DOCUMENTS

EP    0 678 967 A1    10/1995

(Continued)

OTHER PUBLICATIONS

Machine translation of Japanese publication No. JP 11-243653, published Sep. 7, 1999.

(Continued)

*Primary Examiner*—Tran Nguyen
(74) *Attorney, Agent, or Firm*—Finnegan, Henderson, Farabow, Garrett & Dunner

(57) ABSTRACT

An electric machine includes a stator and a rotor disposed adjacent the stator. The rotor may be rotatable around a rotor rotation axis. The rotor may include a rotor core and a plurality of permanent magnets. The plurality of permanent magnets may include a permanent-magnet cluster disposed at least partially within the rotor core. The permanent-magnet cluster may be configured to create a magnetic pole of the rotor. Additionally, the permanent-magnet cluster may include multiple radial permanent-magnet layers. The rotor may also include one or more axially-extending channels located in a portion of the rotor core disposed between adjacent radial permanent-magnet layers.

28 Claims, 3 Drawing Sheets

U.S. PATENT DOCUMENTS

| | | | |
|---|---|---|---|
| 5,159,220 | A | 10/1992 | Kliman |
| 5,187,401 | A | 2/1993 | Rahman |
| 5,191,256 | A | 3/1993 | Reither, Jr. et al. |
| 5,331,245 | A | 7/1994 | Burgbacher et al. |
| 5,418,416 | A | 5/1995 | Müller |
| 5,500,994 | A | 3/1996 | Itaya |
| 5,510,662 | A | 4/1996 | Tanimoto et al. |
| 5,554,900 | A | 9/1996 | Pop, Sr. |
| 5,627,423 | A | 5/1997 | Marioni |
| 5,663,605 | A | 9/1997 | Evans et al. |
| 5,818,140 | A | 10/1998 | Vagati |
| 5,898,253 | A | 4/1999 | El-Antably et al. |
| 5,925,960 | A * | 7/1999 | Hayes .................... 310/211 |
| 5,945,758 | A | 8/1999 | Goltz et al. |
| 5,945,760 | A | 8/1999 | Honda et al. |
| 6,008,559 | A | 12/1999 | Asano et al. |
| 6,025,667 | A * | 2/2000 | Narita et al. ........... 310/156.53 |
| 6,034,458 | A | 3/2000 | Uetake et al. |
| 6,066,904 | A | 5/2000 | Fei et al. |
| 6,072,256 | A | 6/2000 | Shon et al. |
| 6,084,496 | A | 7/2000 | Asano et al. |
| 6,087,751 | A | 7/2000 | Sakai |
| 6,121,706 | A | 9/2000 | Nashiki et al. |
| 6,198,372 | B1 | 3/2001 | Schwarz |
| 6,218,753 | B1 * | 4/2001 | Asano et al. ........... 310/156.53 |
| 6,225,724 | B1 | 5/2001 | Toide et al. |
| 6,234,767 | B1 * | 5/2001 | Takeda et al. ................ 417/355 |
| 6,239,526 | B1 | 5/2001 | Oh et al. |
| 6,259,181 | B1 | 7/2001 | Kawano et al. |
| 6,271,613 | B1 | 8/2001 | Akemakou et al. |
| 6,271,616 | B1 | 8/2001 | Akemakou |
| 6,285,104 | B1 | 9/2001 | Nashiki |
| 6,300,703 | B1 | 10/2001 | Kawano et al. |
| 6,329,734 | B1 | 12/2001 | Takahashi et al. |
| 6,340,857 | B2 | 1/2002 | Nishiyama et al. |
| 6,342,745 | B1 | 1/2002 | Sakai et al. |
| 6,351,050 | B1 | 2/2002 | Coles |
| 6,353,275 | B1 | 3/2002 | Nishiyama et al. |
| 6,423,386 | B2 | 7/2002 | Iwasaki et al. |
| 6,427,534 | B2 | 8/2002 | D'Amico et al. |
| 6,448,680 | B1 | 9/2002 | Akemakou |
| 6,462,451 | B1 | 10/2002 | Kimura et al. |
| 6,486,581 | B2 | 11/2002 | Miyashita et al. |
| 6,552,462 | B2 | 4/2003 | Sakai et al. |
| 6,555,940 | B2 * | 4/2003 | Naito et al. ............ 310/156.56 |
| 6,597,079 | B2 | 7/2003 | Miyashita et al. |
| 6,630,762 | B2 | 10/2003 | Naito et al. |
| 6,664,688 | B2 | 12/2003 | Naito et al. |
| 6,674,205 | B2 | 1/2004 | Biais et al. |
| 6,675,460 | B2 | 1/2004 | Reiter, Jr. et al. |
| 6,713,926 | B2 | 3/2004 | Wauke |
| 6,741,002 | B2 | 5/2004 | Nishiyama et al. |
| 6,849,983 | B2 | 2/2005 | Tajima et al. |
| 6,884,513 | B2 | 4/2005 | Kikugawa et al. |
| 6,891,298 | B2 | 5/2005 | Gary |
| 6,940,196 | B2 | 9/2005 | Gysin |
| 7,015,614 | B2 * | 3/2006 | Sakuma et al. ......... 310/156.53 |
| 2001/0028201 | A1 | 10/2001 | Miyshita et al. |
| 2001/0043020 | A1 | 11/2001 | Nishiyama et al. |
| 2002/0041127 | A1 | 4/2002 | Naito et al. |
| 2002/0041128 | A1 | 4/2002 | Nishiyama et al. |
| 2002/0047409 | A1 | 4/2002 | Hiroyuki et al. |
| 2002/0047432 | A1 | 4/2002 | Miyashita et al. |
| 2002/0117923 | A1 | 8/2002 | Takei |
| 2003/0052561 | A1 | 3/2003 | Rahman et al. |
| 2003/0062790 | A1 | 4/2003 | Reiter, Jr. et al. |
| 2003/0164655 | A1 | 9/2003 | Biais et al. |
| 2003/0168925 | A1 | 9/2003 | Bernreuther et al. |
| 2003/0209950 | A1 | 11/2003 | Biais et al. |
| 2004/0017123 | A1 | 1/2004 | Miyashita et al. |
| 2004/0251759 | A1 | 12/2004 | Hirzel |
| 2006/0043812 | A1 * | 3/2006 | Cheong et al. ......... 310/156.53 |
| 2006/0119203 | A1 * | 6/2006 | Brown et al. ........... 310/156.53 |

FOREIGN PATENT DOCUMENTS

| | | |
|---|---|---|
| EP | 0 809 343 B1 | 11/1997 |
| EP | 0 909 003 A2 | 4/1999 |
| EP | 0 909 003 A3 | 4/1999 |
| EP | 1 014 542 A2 | 6/2000 |
| EP | 1 014 542 A3 | 6/2000 |
| EP | 1 028 047 A2 | 8/2000 |
| EP | 1 123 576 B1 | 8/2001 |
| EP | 1 139 548 A2 | 10/2001 |
| EP | 1 300 208 A2 | 4/2003 |
| EP | 1 139 548 A3 | 10/2003 |
| JP | 10066285 A * | 3/1998 |
| JP | 11243653 A * | 9/1999 |
| JP | 2000270525 A * | 9/2000 |
| JP | 2004-64887 | 2/2004 |

OTHER PUBLICATIONS

Machine translation of Japanese publication No. JP 10-66285, published Mar. 6, 1998.

* cited by examiner

ROTOR HAVING PERMANENT MAGNETS AND AXIALY-EXTENDING CHANNELS

TECHNICAL FIELD

The present disclosure relates to electric machines having a stator and a rotor and, more particularly, to electric machines having a rotor that includes permanent magnets.

BACKGROUND

Many electric machines, such as electric motors and electric generators, include a stator that is held stationary and a rotor that rotates adjacent the stator. The stator and rotor may be configured to transfer power between one another through one or more rotating magnetic fields. Some electric machines may include a permanent-magnet type rotor with permanent magnets mounted on or inside a body of the rotor to create a magnetic field that rotates with the rotor. Each permanent magnet of the rotor may individually create a north or south magnetic pole of the rotor. A permanent-magnet type rotor having only a single permanent magnet creating each of its magnetic poles may, however, limit the performance potential of the associated electric machine.

U.S. Pat. No. 6,555,940 to Naito et al. ("the '940 patent") shows a permanent-magnet rotor having a plurality of permanent magnets creating each magnetic pole of the rotor. The permanent-magnet rotor of the '940 patent includes five arcuate permanent magnets mounted in each quadrant of a rotor core with the concave sides of the arcuate permanent magnets facing radially outward with respect to a central axis of the permanent-magnet rotor. In two of the quadrants of the rotor core, the north magnetic pole of each permanent magnet faces away from the central axis of the rotor, such that the five permanent magnets create a north magnetic pole. In the other two quadrants, the south magnetic poles of the permanent magnets face away from the central axis of the rotor, such that the permanent magnets disposed in each of those quadrants create a south magnetic pole of the rotor.

The five permanent magnets in each quadrant of the rotor core of the '940 patent are arranged in three radial layers with respect to the central axis of the rotor. An outer radial layer includes one of the permanent magnets with its convex side facing radially inward. An intermediate layer includes two of the permanent magnets extending along a common arc parallel to, and radially inside of, the first permanent magnet. An inner layer includes the remaining two magnets extending along a common arc parallel to, and radially inside of, the two permanent magnets of the intermediate layer. In each quadrant, portions of the rotor core disposed between the layers of permanent magnets are connected to portions of the rotor core disposed radially inside of the inner layer of permanent magnets only by thin portions of the rotor core extending past ends of the permanent magnets in the inner layer.

Although the permanent-magnet rotor of the '940 patent includes multiple permanent magnets that create each of its magnetic poles, certain disadvantages persist. For example, portions of the rotor core between the layers of permanent magnets have relatively large masses, which may cause relatively large centrifugal forces on these portions of the rotor core during rotation of the rotor. This may create undesirably high stresses in the relatively narrow portions of the rotor core that connect the portions of the rotor core between the layers of magnets to the portions of the rotor core disposed radially inside the inner layer of magnets. Additionally, during use of the rotor of the '940 patent in an electric motor or generator, the temperature of permanent magnets of the rotor and the portions of the rotor core disposed between adjacent layers of permanent magnets may increase. As the temperature of the portions of rotor core between adjacent layers of the permanent magnets increases, these portions of the rotor core may accept less heat from, or even reject heat to, the adjacent permanent magnets. This may cause the permanent magnets to reach undesirably high temperatures.

The electric machine of the present disclosure solves one or more of the problems set forth above.

SUMMARY OF THE INVENTION

One disclosed embodiment relates to an electric machine that may include a stator and a rotor disposed adjacent the stator. The rotor may be rotatable around a rotor rotation axis. The rotor may include a rotor core and a plurality of permanent magnets. The plurality of permanent magnets may include a permanent-magnet cluster disposed at least partially within the rotor core. The permanent-magnet cluster may be configured to create a magnetic pole of the rotor. Additionally, the permanent-magnet cluster may include multiple radial permanent-magnet layers. The rotor may also include one or more axially-extending channels located in a portion of the rotor core disposed between adjacent radial permanent-magnet layers.

Another aspect of the present disclosure relates to an electric machine that may include a stator and a rotor disposed adjacent the stator. The rotor may be rotatable around a rotor rotation axis. The rotor may include a rotor core and a plurality of permanent magnets mounted to the rotor core. The plurality of permanent magnets may create a plurality of magnetic poles of the rotor. Additionally, the rotor may include one or more axially-extending channels disposed within the rotor core. At least one of the axially-extending channels may extend from a first opening in a first end of the rotor, to a second opening in a second end of the rotor. The electric machine may further include one or more fan blades configured to drive or draw air through one or more of the axially-extending channels.

A further aspect of the present disclosure relates to an electric machine that may include a stator and a rotor disposed adjacent the stator. The rotor may be rotatable around a rotor rotation axis. The rotor may include a rotor core and a plurality of permanent magnets. The plurality of permanent magnets may include a permanent-magnet cluster, which may be disposed at least partially within the rotor core and configured to create a magnetic pole of the rotor. The permanent-magnet cluster may include a first permanent magnet and a second permanent magnet. Additionally, the rotor may include one or more axially-extending channels located in a portion of the rotor core disposed inside the permanent-magnet cluster. One or more of the axially-extending channels may be positioned such that magnetic flux flowing between magnetic poles of the first permanent magnet and the second permanent magnet flows around one or more of the axially-extending channels.

DETAILED DESCRIPTION

Figure 1A:
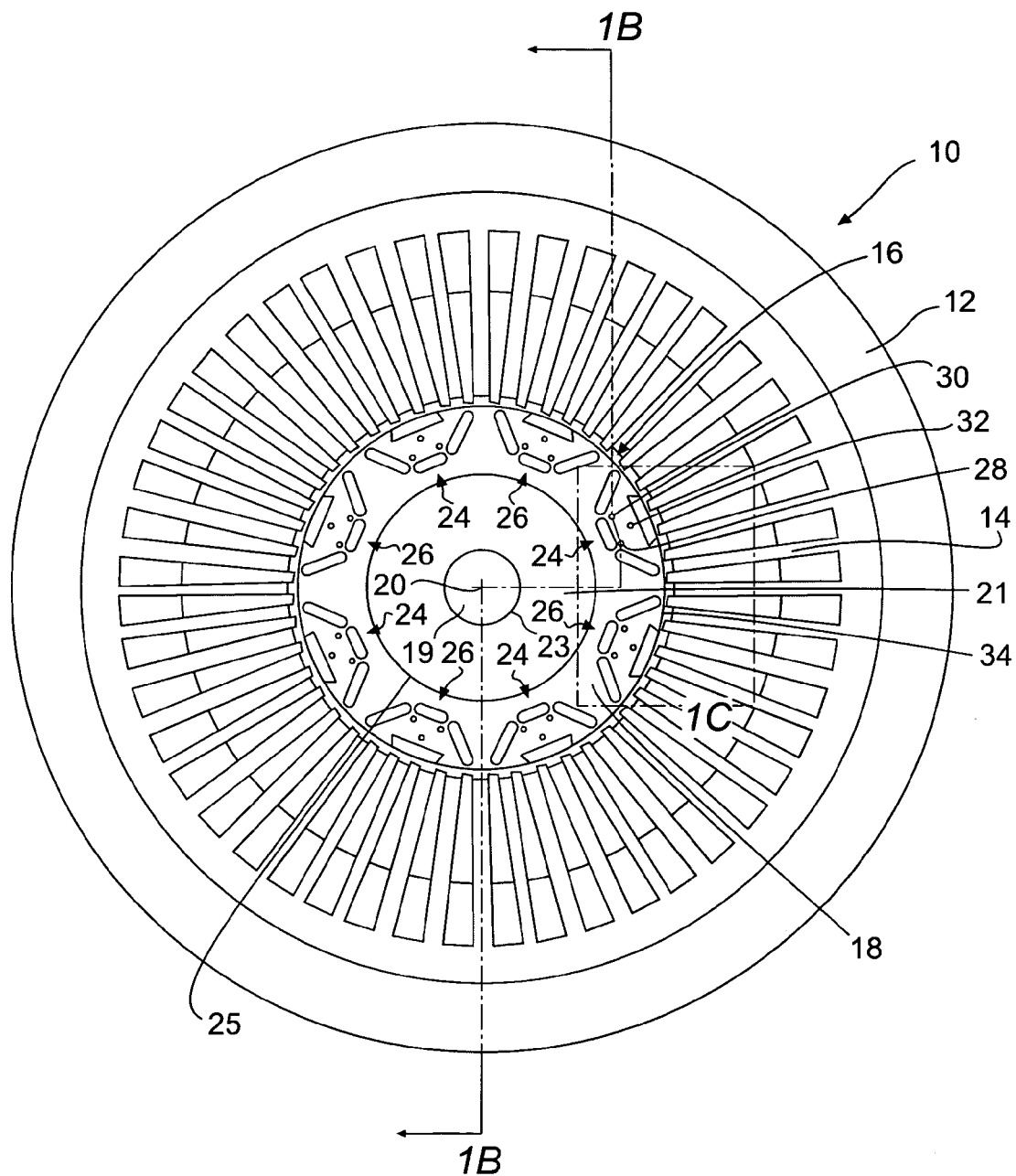
FIG. 1A is a sectional illustration of one embodiment of an electric machine according to the present disclosure.
Figure 1B:
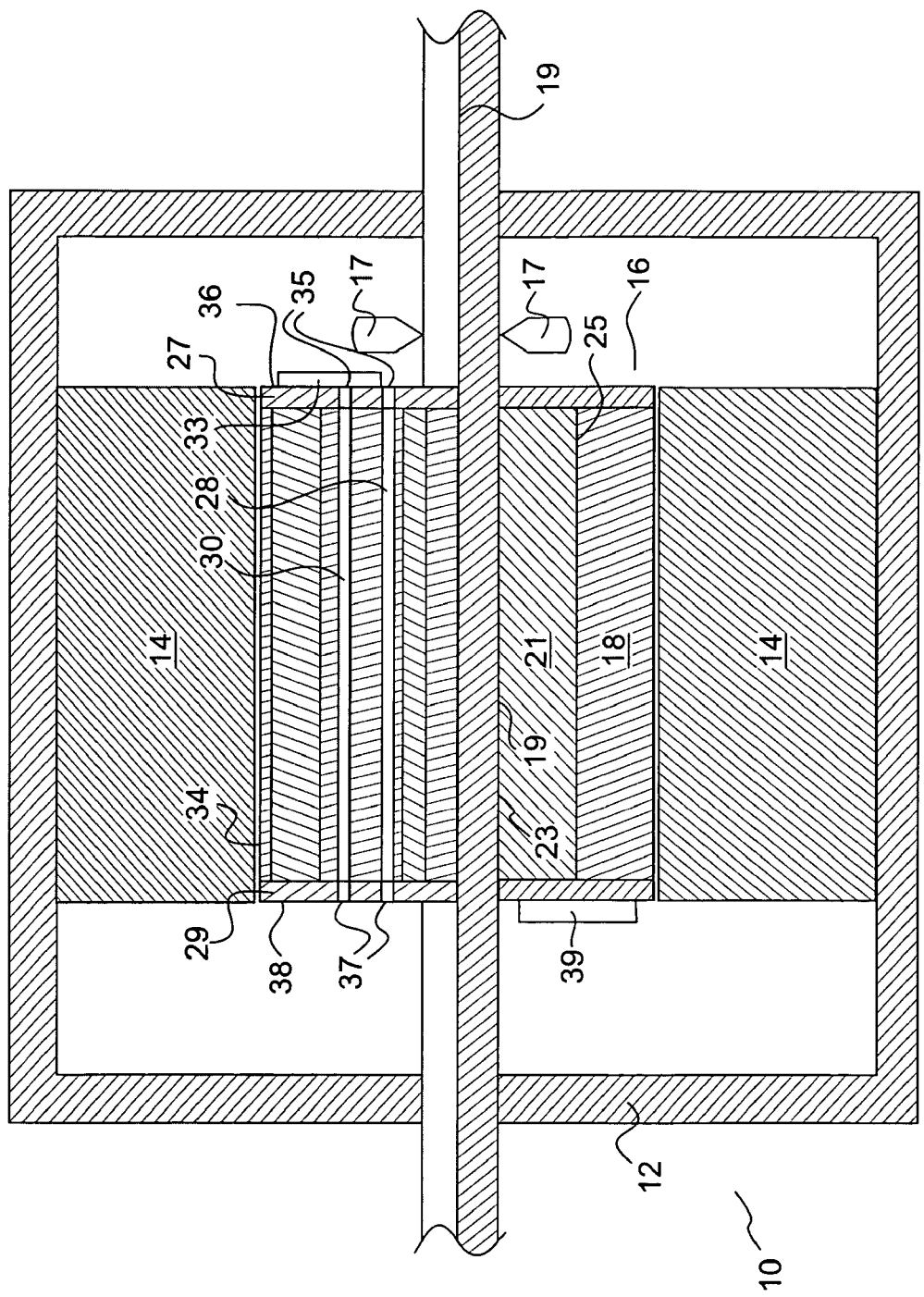
FIG. 1B is a sectional illustration of the electric machine, through line 1B-1B of FIG. 1A.

FIGS. 1A and 1B illustrate one embodiment of an electric machine 10 according to the present disclosure. Electric machine 10 may include a housing 12, a stator 14, rotor 16. Electric machine 10 may be configured to operate as an electric motor and/or an electric generator.

Housing 12 may provide support for stator 14 and rotor 16. Rotor 16 may be supported by housing 12 in such a manner that rotor 16 may rotate about a rotor rotation axis 20. Housing 12 may support stator 14 in a stationary position adjacent rotor 16. As FIG. 1A shows, in some embodiments, stator 14 may extend around rotor rotation axis 20 and rotor 16.

Stator 14 may include windings of an electrical conductor (not shown), such as wire. In some embodiments, such windings of the electrical conductor may be configured to receive electricity from an electrical power source and produce a rotating magnetic field. Additionally, in some embodiments, such coils of electrical conductor may be configured to produce electrical current when exposed to a rotating magnetic field produced by rotation of rotor 16.

Rotor 16 may include a rotor shaft 19, a rotor hub 21, a rotor core 18, and an endplates 27, 29. Rotor hub 21 may surround rotor shaft 19 and be fixedly connected to rotor shaft 19 at a hub/shaft interface 23. Rotor hub 21 may be constructed of material with a relatively low permeability to magnetic flux. Rotor core 18 may surround rotor hub 21 and be fixedly connected to rotor hub 21 at a core/hub interface 25. Rotor core 18 may be constructed of material with a relatively high permeability to magnetic flux. As is best shown in FIG. 1B, endplate 27 may be fixedly attached to one end of rotor hub 21 and rotor core 18, and endplate 29 may be fixedly attached to an opposite end of rotor hub 21 and rotor core 18. An outer surface of endplate 27 may form an end 36 of rotor 16, and an outer surface of endplate 29 may form an opposite end 38 of rotor 16.

Rotor 16 may also include permanent magnets, some or all of which may be arranged in permanent-magnet clusters 24, 26. As used herein, the term permanent-magnet cluster refers to two or more permanent magnets arranged in a group. Permanent-magnet clusters 24 and permanent-magnet clusters 26 may be disposed in alternating positions around rotor rotation axis 20 adjacent an outer perimeter 34 of rotor 16. As will be described in greater detail below, permanent-magnet clusters 24 may create north magnetic poles of rotor 16, and permanent-magnet clusters 26 may create south magnetic poles of rotor 16.

Rotor 16 may further include axially extending channels 28, 30, 32 in rotor core 18 and endplates 27, 29. As FIG. 1B shows, one or more of axially-extending channels 28, 30, 32 may extend completely through rotor 16. For example, each of axially-extending channels 28, 30 shown in FIG. 1B extends from an opening 35 in end 36 of rotor 16, through endplate 27, rotor core 18, and endplate 29 to an opening 37 in end 38 of rotor 16.

As can be seen in FIG. 1B, electric machine 10 may further include fan blades 31, 33, 39. Fan blades 31, 33, 39 may be any structure operable to drive or draw air through axially-extending channels 28, 30, 32 such as by moving air axially toward or away from and/or radially toward or away from one or more of openings 35, 37 in ends 36, 38 of rotor 16. For example, fan blades 31 may be propeller-like blades disposed adjacent end 36 of rotor 16 and configured to move air axially toward or away from openings 35. Additionally, fan blades 33, 39 may be fins disposed adjacent ends 36, 38 of rotor 16 and configured to move air radially and/or axially toward or away from openings 37. In some embodiments fan blades 31, 33, 39 may be fixedly engaged to rotor 16 so as to be operable to drive or draw air through axially-extending channels 28, 30, 32 when rotor 16 rotates. For example, fan blades 31 may be fixedly engaged to rotor shaft 19, and fan blades 33, 39 may be fixedly mounted to endplates 27, 29.

Figure 1C:
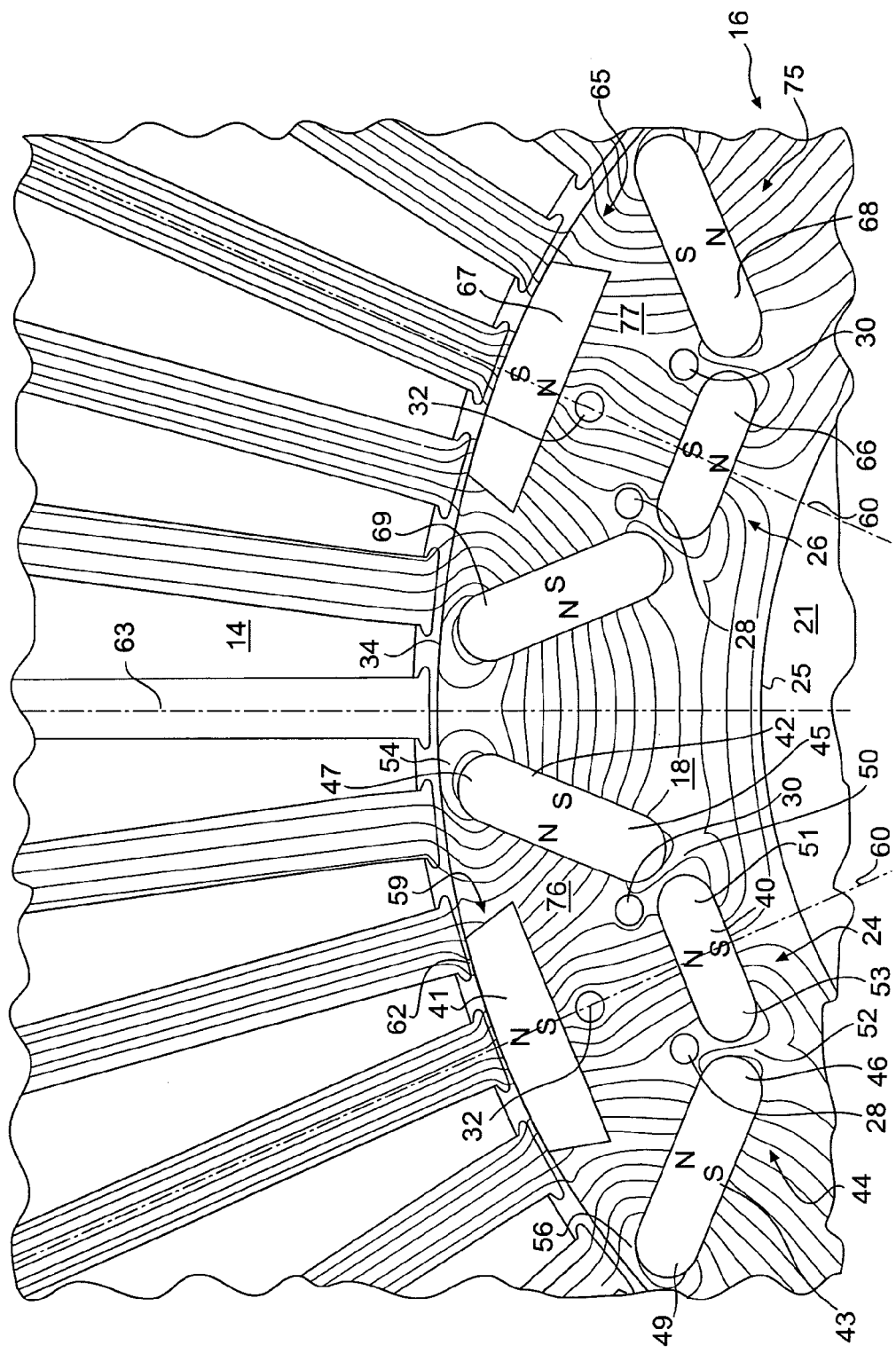
FIG. 1C is an enlarged view of the portion of FIG. 1A shown in rectangle 1C.

FIG. 1C shows a pair of permanent-magnet clusters 24, 26 in greater detail and also shows the magnetic flux created by permanent-magnet clusters 24, 26. Permanent-magnet cluster 24 may include permanent magnets 40, 41, 42, 43. Permanent magnets 40-43 may be arranged in multiple radial permanent-magnet layers with respect to rotor rotation axis 20. Permanent magnets 40, 42, 43 may form an inner radial permanent-magnet layer 44. Permanent magnet 40 may extend approximately parallel to outer perimeter 34 of rotor 16. Ends 45, 46 of permanent magnets 42, 43 may be disposed adjacent opposite ends 51, 53 of permanent magnet 40. From their ends 45, 46, permanent magnets 42, 43 may extend away from one another and radially outward to ends 47, 49, which may be disposed adjacent outer perimeter 34 of rotor 16. The north magnetic poles of permanent magnets 40-43 may face generally outward. Permanent magnet 41 may form an outer radial permanent-magnet layer 59. Permanent magnet 41 may extend substantially parallel to permanent magnet 40 between ends 47, 49 of permanent magnets 42, 43. Permanent magnet 41 may also form a portion of outer perimeter 34 of rotor 16.

As was mentioned above, permanent-magnet cluster 24 may form a north magnetic pole of rotor 16. Because the north magnetic pole of permanent magnet 41 is disposed outside rotor core 18, magnetic flux from the north magnetic pole of permanent magnet 41 is also forced to flow substantially radially across an air gap 62, into stator 14. Additionally, the configuration of permanent-magnet cluster 24 may ensure that the magnetic flux generated by the north magnetic poles of permanent-magnets 40, 42, 43 flows primarily across air gap 62, into stator 14.

Inner radial permanent-magnet layer 44 may create a barrier to magnetic flux that substantially magnetically isolates a portion 76 of rotor core 18 disposed inside permanent-magnet cluster 24 from portions of rotor core 18 disposed outside permanent-magnet cluster 24. Because permanent magnets 40, 42, 43 have a low permeability to magnetic flux, permanent magnets 40, 42, 43 greatly impede magnetic flux from flowing across them to enter or exit portion 76 of rotor core 18. Additionally, magnetic flux from permanent magnets 40, 42, 43 may saturate portions 50, 52, 54, 56 of rotor core 18 adjacent ends 45-47, 49, 51, 53 of permanent magnets 40, 42, 43. When saturated with magnetic flux portions 50, 52, 54, 56 of rotor core 18 also have a low permeability to magnetic flux and, therefore, greatly impede magnetic flux from flowing through them to enter or exit portion 76 of rotor core 18. As a result, very little of the magnetic flux generated by the north magnetic poles of permanent magnets 40, 42, 43 may leave permanent-magnet cluster 24 by flowing across permanent magnets 40, 42, 43 or through portions 50, 52, 54, 56 of rotor core 18. So, nearly all of the magnetic flux generated by the north magnetic poles of permanent magnets 40, 42, 43 may be forced to leave permanent-magnet cluster 24 by flowing substantially radially across air gap 62, into stator 14.

Permanent-magnet cluster 26 may include permanent magnets 66, 67, 68, 69, which may form a south magnetic pole of rotor 16. Permanent magnets 66-69 may be arranged substantially the same with respect to an outer perimeter 34 of rotor 16 as permanent magnets 40-43, except that permanent magnets 66-69 may have their south magnetic poles, rather than their north magnetic poles, facing generally outward. Permanent magnet 67 may form an outer radial permanent-magnet layer 65 with respect to rotor rotation axis 20. Permanent magnets 66, 68, 69 may form an inner radial permanent-magnet layer 75 of permanent-magnet cluster 26. Similar to portion 76 of rotor core 18, a portion 77 of rotor core 18 bounded by outer perimeter 34 and inner radial permanent-magnet layer 75 may be magnetically isolated from other portions of rotor core 18 by inner radial permanent-magnet layer 75. Thus, permanent-magnet cluster 26 may form a south magnetic pole of rotor 18 with magnetic flux flowing radially across air gap 62 into permanent-magnet cluster 26.

In addition to creating north and south magnetic poles of rotor 16, permanent-magnet clusters 24, 26 may define the locations of "d" axes 60 of rotor 16, which are radial axes along which rotor 16 has its highest reluctance. By magnetically isolating portions 76, 77 of rotor core 18 from other portions of rotor core 18, permanent-magnet clusters 24, 26 greatly impede magnetic flux from flowing radially between core/hub interface 25 and outer perimeter 34. By contrast, in the embodiments shown in FIGS. 1A-1C, portions of rotor core 18 between permanent-magnet clusters 24, 26 provide a path through which flux may readily flow in radial directions between core/hub interface 25 and outer perimeter 34. Accordingly, "d" axes 63 of rotor 16 may extend through the center of permanent-magnet clusters 24, 26, and "q" axes 63, which are axes along which rotor 16 has its lowest reluctance, may extend between permanent-magnet clusters 24, 26.

Referring still to FIG. 1C, axially-extending channels 28, 30, 32 may be disposed inside permanent-magnet cluster 24 within portions of rotor core 18 where axially-extending channels 28, 30, 32 allow magnetic flux from permanent magnets 40, 42, 43 to flow through rotor core 18 relatively undisturbed. For example, axially-extending channels 28 and 30 may be disposed adjacent portions 50, 52 of rotor core 18, such that magnetic flux flowing from the north magnetic poles of permanent magnets 40, 42, 43 may flow around axially-extending channels 28, 30 relatively freely. Additionally, axially-extending channel 32 may be located near the middle of the south magnetic pole of permanent magnet 41. In this location, axially-extending channel 32 may present little or no resistance to magnetic flux flowing from the north magnetic poles of permanent magnets 40, 42, 43, around axially-extending channel 32, to the south magnetic pole of permanent magnet 41. Rotor 16 may also include axially-extending channels 28, 30, 32 similarly situated in portions of rotor core 18 inside permanent-magnet cluster 26.

Electric machine 10 is not limited to the configuration illustrated in FIGS. 1A-1C. For example, rotor 16 may include more or less permanent-magnet clusters 24, 26 than shown in FIGS. 1A-1C. Similarly, one or more of permanent-magnet clusters 24, 26 of rotor 16 may have different numbers and/or arrangements of permanent magnets. For example, inner radial permanent-magnet layers 44, 75 may have other configurations that magnetically isolate portions 76, 77 from portions of rotor core 18 disposed outside permanent-magnet clusters 24, 26. Furthermore, permanent magnet 41 may be disposed entirely within rotor core 24, rather than forming a portion of outer perimeter 34 of rotor 16. Moreover, one or more of the magnetic poles of rotor 16 may be created by a single permanent magnet. Additionally, rotor 16 may omit endplates 27, 29, and ends 36, 38 of rotor 16 may be formed by rotor hub 21 and rotor core 18.

Additionally, the configurations of axially-extending channels 28, 30, 32 may vary from those shown in FIGS. 1A-1C. For example, while FIG. 1B shows axially-extending channels 28, 30 extending parallel to rotor rotation axis 20, one or more of axially-extending channels 28, 30, 32 may be disposed at some angle to rotor rotation axis 20, while still extending primarily axially within rotor core 18. Additionally, one or more of axially-extending channels 28, 30, 32 may curve along their lengths. Furthermore, the cross-sectional shapes and/or dimensions of axially-extending channels 28, 30, 32 may differ from the configurations shown in FIG. 1C. Moreover, the cross-sectional shapes and/or dimensions of axially-extending channels 28, 30, 32 may change over their lengths. Additionally, one or more of axially-extending channels 28, 30, 32 may extend only partially through rotor 16. Furthermore, while FIG. 1C shows axially-extending channels 28, 30, 32 being separated from permanent magnets 40-43, one or more of axially-extending channels 28, 30, 32 may extend contiguous to one or more of permanent magnets 40-43.

Moreover, fan blades 31, 33, 39 may be configured and/or mounted differently. For example, rather than being drivingly connected to any part of rotor 16, fan blades 31, 33, 39 may be drivingly connected to some other component configured to provide power to fan blades 31, 33, 39 to drive or draw air through axially-extending channels 28, 30, 32. Additionally, fan blades 31, 33, 39 may have different configurations than shown in FIG. 1B. For example, fan blades 31, 33, 39 may be squirrel-cage type fan blades. Furthermore, electric machine 10 may omit fan blades 31, fan blades 33, and/or fan blades 39.

INDUSTRIAL APPLICABILITY

Electric machine 10 may have application as an electric motor in any system requiring conversion of electrical power into mechanical power. Additionally, electrical machine 10 may have application as an electric generator in any system requiring conversion of mechanical power into electrical power.

During operation of electrical machine 10 as an electric motor, stator 14 may receive electric current from an electrical power source. For example, stator 14 may receive single-phase or multi-phase alternating current. Current flowing through stator 14 may create a rotating magnetic field around rotor 16.

Simultaneously, magnetic flux from permanent-magnet clusters 24, 26 of rotor 16 may flow through stator 14. As can be seen in FIG. 1C, magnetic flux from the north magnetic poles created by permanent-magnet clusters 24 may flow radially outward across air gap 62, through stator 14, to an outer portion of stator 14. Subsequently, this magnetic flux may flow circumferentially within the outer portion of stator 14, radially inward through stator 14, across air gap 62, to the south magnetic poles formed by permanent-magnet clusters 26. The magnetic flux created by permanent-magnet clusters 24, 26 and the rotating magnetic field created by stator 14 may interact to apply torque to rotor 16 and, thereby, rotate rotor 16 around rotor rotation axis 20. Rotor shaft 19 may drive any components connected thereto.

The arrangement of permanent magnets 40-43, permanent magnets 66-69, and axially-extending channels 28, 30, 32 may give electric machine 10 desirable operating characteristics when operated as an electric motor. In embodiments where permanent-magnet clusters 24, 26 each include multiple radial permanent-magnet layers 44, 59, 65, 75, electric machine 10 may have a relatively large constant-power speed range. Additionally, because nearly all magnetic flux flowing from permanent-magnet clusters 24 travels through stator 14 on its way to permanent-magnet clusters 26, machine 10 may have a relatively high power output. Furthermore, placing axially-extending channels 28, 30, 32 such that they create minimal disturbance of magnetic flux flowing through portions of rotor core 18 inside permanent-magnet clusters 24, 26 may contribute to a relatively high power output of electric machine 10. Moreover, because permanent magnets 41, 67 each form a portion of outer perimeter 34 of rotor 16, flux traveling from permanent magnet 41 to permanent magnet 67 need not flow through rotor core 18, which may also contribute to a high power output of electric machine 10.

When electric machine 10 is operating as an electric motor, axially-extending channels 28, 30, 32 may reduce thermal stress on rotor core 18 and permanent magnets 40-43, 66-69. During operation of electric machine 10 as an electric motor, the temperature of permanent magnets 40-43 and 66-69 may rise significantly. As a result, permanent magnets 40-43 and 66-69 may reject heat to adjacent portions of rotor core 18. Because portions 76, 77 of rotor core 18 may receive heat at multiple sides from permanent magnets 40-43 and 66-69, portions 76, 77 of rotor core 18 may reach higher temperatures than other portions of rotor core 18. Air flowing into and out of axially-extending channels 28, 30, 32 may cool portions 76, 77 of rotor core 18 and adjacent permanent magnets 40-43, 66-69. By driving or drawing air through axially-extending channels 28, 30, 32, fan blades 31, 33 may increase the rate at which air within axially-extending channels 28, 30, 32 cools portions 76, 77 of rotor core 18 and permanent magnets 40-43, 66-69.

Including axially-extending channels 28, 30, 32 in portions 76, 77 of rotor core 18 may also reduce mechanical stresses that occur in portions 50, 52, 54, 56 during rotation of rotor 16. Rotation of rotor 16 around rotor rotation axis 20 may create centrifugal force on portion 76, which may create stress in portions 50, 52, 54, 56 of rotor core 18. Including axially-extending channels 28, 30, 32 in portion 76 of rotor core 18 may reduce the mass of portion 76 of rotor core 18, which may reduce the stresses that rotation of rotor 16 creates in portions 50, 52, 54, 56. For the same reasons, including axially-extending channels 28, 30, 32 in portion 77 of rotor core 18 may also contribute to reduced operating stress in rotor core 18. In some embodiments, stresses in portions 50, 52, 54, 56, and/or stresses in portions of rotor core 18 that connect portion 77 to other portions of rotor core 18 may be a factor that limits the maximum allowable rotating speed of rotor 16. Accordingly, including axially-extending channels 28, 30, 32 in portions 76, 77 of rotor core 18 may increase the maximum allowable rotation speed of rotor 16.

It will be apparent to those skilled in the art that various modifications and variations can be made in the disclosed electric machine 10 without departing from the scope of the disclosure. Other embodiments of the disclosed electric machine 10 will be apparent to those skilled in the art from consideration of the specification and practice of the electric machine 10 disclosed herein. It is intended that the specification and examples be considered as exemplary only, with a true scope of the disclosure being indicated by the following claims and their equivalents.

What is claimed is:

1. An electric machine, including:
   a stator; and
   a rotor disposed adjacent the stator, the rotor being rotatable around a rotor rotation axis, wherein the rotor includes:
   a rotor core;
   a plurality of permanent magnets, including a permanent-magnet cluster disposed at least partially within the rotor core, wherein:
   the permanent-magnet cluster is configured to create a magnetic pole of the rotor;
   the permanent-magnet cluster includes multiple radial permanent-magnet layers; and
   one or more open axially-extending channels located in a portion of the rotor core disposed between adjacent radial permanent-magnet layers of the permanent-magnet cluster, wherein at least one of the one or more open axially-extending channels is disposed in a position other than adjacent a portion of the rotor core between ends of two permanent magnets of the permanent-magnet cluster.

2. The electric machine of claim 1, wherein at least one of the one or more open axially-extending channels is disposed adjacent a portion of the rotor core located between ends of two permanent magnets of the permanent-magnet cluster.

3. The electric machine of claim 1, wherein:
   one of the radial permanent-magnet layers is an inner radial permanent-magnet layer of the permanent-magnet cluster; and
   wherein a portion of the rotor core bounded by an outer perimeter of the rotor and the inner radial permanent-magnet layer is substantially magnetically isolated from portions of the rotor core outside the permanent-magnet cluster by the inner radial permanent-magnet layer.

4. The electric machine of claim 1, wherein:
   one of the adjacent radial permanent-magnet layers is an inner radial permanent-magnet layer of the permanent-magnet cluster; and
   the inner radial permanent-magnet layer includes a first permanent magnet and a second permanent magnet that extend away from one another as they extend toward an outer perimeter of the rotor.

5. The electric machine of claim 4, wherein the inner radial permanent-magnet layer further includes a third permanent magnet disposed between an inner end of the first permanent magnet and an inner end of the second permanent magnet.

6. The electric machine of claim 5, wherein:
   the rotor core includes a first portion disposed between the inner end of the first permanent magnet and an adjacent end of the third permanent magnet;
   one of the one or more open axially-extending channels is located adjacent the first portion of the rotor core;
   the rotor core includes a second portion disposed between the inner end of the second permanent magnet and an adjacent end of the third permanent magnet; and
   one of the one or more open axially-extending channels is located adjacent the second portion of the rotor core.

7. The electric machine of claim 6, wherein:
   the inner radial permanent-magnet layer is a first one of the adjacent radial permanent-magnet layers;
   a second one of the adjacent radial permanent-magnet layers is an outer radial permanent-magnet layer;
   the outer radial permanent-magnet layer of the permanent-magnet cluster includes a fourth permanent magnet, wherein the fourth permanent magnet has an inner magnetic pole facing the third permanent magnet; and
   at least one of the one or more open axially-extending channels is disposed in a portion of the rotor core adjacent the inner magnetic pole of the fourth permanent magnet.

8. The electric machine of claim 1, wherein:
   the multiple radial permanent-magnet layers of the permanent-magnet cluster include
   a first radial permanent-magnet layer, the first permanent-magnet layer including
   a first permanent magnet, a second permanent magnet extending from adjacent a first end of the first permanent magnet, toward the outer perimeter of the rotor, and a third permanent magnet extending from adjacent a second end of the first permanent magnet, toward the outer perimeter of the rotor, a second radial permanent-magnet layer, including a fourth permanent magnet disposed radially outward of the first permanent magnet, between the second permanent magnet and the third permanent magnet; and the one or more open axially-extending channels include a first open axially-extending channel disposed adjacent a portion of the rotor core located between the first end of the first permanent magnet and the first end of the second permanent magnet, a second open axially-extending channel disposed adjacent a portion of the rotor core located between the second end of the first permanent magnet and the first end of the third permanent magnet, and a third open axially-extending channel disposed adjacent a side of the fourth permanent magnet that faces the first permanent magnet.

9. The electric machine of claim 1, wherein at least one of the one or more open axially-extending channels extends completely through the rotor.

10. An electric machine including:

a stator; and a rotor disposed adjacent the stator, the rotor being rotatable around a rotor rotation axis, wherein the rotor includes:

a rotor core;

a plurality of permanent magnets, including a permanent-magnet cluster disposed at least partially within the rotor core, wherein:

the permanent-magnet cluster is configured to create a magnetic pole of the rotor;

the permanent-magnet cluster includes multiple radial permanent-magnet layers;

one or more axially-extending channels located in a portion of the rotor core disposed between adjacent radial permanent-magnet layers of the permanent-magnet cluster, wherein at least one of the one or more axially-extending channels extends completely through the rotor; and one or more fan blades configured to drive or draw air through at least one of the one or more axially-extending channels.

11. The electric machine of claim 10, wherein one or more of the fan blades is drivingly connected to the rotor so as to be operable to drive or draw air through at least one of the one or more open axially-extending channels when the rotor rotates.

12. The electric machine of claim 1, wherein the permanent-magnet cluster is configured such that magnetic flux created by the permanent magnets of the rotor flows substantially radially between the permanent-magnet cluster and the stator.

13. The electric machine of claim 1, wherein the electric machine is configured to operate as an electric motor.

14. The electric machine of claim 1, wherein one of the adjacent radial permanent-magnet layers is an outer radial permanent-magnet layer, including at least one permanent magnet that forms a portion of an outer perimeter of the rotor.

15. The electric machine of claim 1, wherein a radial axis along which the rotor has its highest reluctance extends through the permanent-magnet cluster.

16. An electric machine, comprising:

a stator;

a rotor disposed adjacent the stator, the rotor being rotatable about a rotor rotation axis, wherein the rotor includes a rotor core;

a plurality of permanent magnets mounted to the rotor core, the plurality of permanent magnets creating a plurality of magnetic poles of the rotor, wherein the plurality of permanent magnets includes a permanent-magnet cluster having multiple radial permanent-magnet layers;

one or more axially-extending channels disposed within the rotor core, at least one of the one or more axially-extending channels extending from a first opening in a first end of the rotor, between adjacent radial permanent-magnet layers of the permanent magnet cluster, to a second opening in a second end of the rotor; and one or more fan blades mounted to an end surface of the rotor and configured to drive or draw air through at least one of the one or more axially-extending channels.

17. The electric machine of claim 16, wherein one or more of the fan blades are drivingly connected to the rotor such that rotation of the rotor around the rotor rotation axis causes one or more of the fan blades to drive or draw air through at least one of the one or more axially-extending channels.

18. The electric machine of claim 16, wherein:

the plurality of permanent magnets includes a permanent-magnet cluster; and at least one of the one or more axially-extending channels is located in a portion of the rotor core disposed inside the permanent-magnet cluster.

19. The electric machine of claim 18, wherein at least one of the one or more axially-extending channels is located adjacent a portion of the rotor core disposed between adjacent ends of two permanent magnets of the permanent-magnet cluster.

20. The electric machine of claim 18, wherein:

the permanent-magnet cluster creates a magnetic pole of the rotor; and the permanent-magnet cluster is configured such that magnetic flux created by the permanent magnets flows radially between the permanent-magnet cluster and the stator.

21. The electric machine of claim 16, wherein the electric machine is configured to operate as an electric motor.

22. An electric machine, comprising:

a stator; and a rotor disposed adjacent the stator, the rotor being rotatable around a rotor rotation axis, wherein the rotor includes a rotor core, a plurality of permanent magnets, including a permanent-magnet cluster disposed at least partially within the rotor core and configured to create a magnetic pole of the rotor, wherein the permanent-magnet cluster includes a first permanent magnet, and a second permanent magnet, and one or more axially-extending channels located in a portion of the rotor core disposed inside the permanent-magnet cluster, including a first axially-extending channel, wherein a first portion of magnetic flux flowing between a magnetic pole of the first magnet and a magnetic pole of the second magnet flows around one side of the first axially-extending channel and a second portion of the magnetic flux flowing between the magnetic pole of the first magnet and the magnetic pole of the second magnet flows around an opposite side of the first axially-extending channel.

23. The electric machine of claim 22, wherein the permanent-magnet cluster is configured such that magnetic flux created by the permanent magnets flows radially between the permanent-magnet cluster and the stator.

24. The electric machine of claim 22, wherein:
the first permanent magnet forms at least part of an outer radial permanent-magnet layer of the permanent-magnet cluster; and
the second permanent magnet forms at least part of an inner radial permanent-magnet layer of the permanent-magnet cluster.

25. The electric machine of claim 24, wherein a portion of the rotor core bounded by an outer perimeter of the rotor and the inner radial permanent-magnet layer is magnetically isolated from portions of the rotor core outside the permanent-magnet cluster by the inner radial permanent-magnet layer.

26. The electric machine of claim 22, wherein at least one of the one or more axially-extending channels extends completely through the rotor.

27. The electric machine of claim 26, further including one or more fan blades configured to drive or draw air through at least one of the one or more axially-extending channels.

28. The electric machine of claim 22, wherein the electric machine is configured to operate as an electric motor.

* * * * *